United States Patent [19]

Kupcikevicius et al.

[11] Patent Number: 4,551,884
[45] Date of Patent: Nov. 12, 1985

[54] METHOD AND APPARATUS FOR USE IN AUTOMATICALLY AND CONTINUOUSLY MAKING SAUSAGES WITH FLAT ENDS

[75] Inventors: Vytautas Kupcikevicius; Vytas Raudys, both of Chicago, Ill.

[73] Assignee: Union Carbide Corporation, Danbury, Conn.

[21] Appl. No.: 675,478

[22] Filed: Nov. 29, 1984

Related U.S. Application Data

[63] Continuation of Ser. No. 430,230, Sep. 30, 1982.

[51] Int. Cl.$^4$ ............................................. A22C 11/00
[52] U.S. Cl. ............................................. 17/49; 17/35
[58] Field of Search .................... 17/1 R, 41, 49, 33, 17/35; 53/576, 567, 415, 449, 474, 129, 137, 170; 206/802

[56] References Cited

U.S. PATENT DOCUMENTS

| Re. 30,265 | 5/1980 | Kupcikevicius | 17/41 |
|---|---|---|---|
| Re. 30,390 | 9/1980 | Kupcikevicius | 17/49 |
| 2,311,843 | 2/1943 | Lee | 17/49 |
| 2,654,121 | 10/1953 | Nelson . | |
| 2,669,749 | 2/1954 | Houland | 17/35 |
| 2,886,073 | 5/1959 | Beck | 17/35 |
| 2,983,949 | 5/1961 | Matecki . | |
| 2,984,574 | 5/1961 | Matecki . | |
| 3,233,281 | 2/1966 | Swift . | |
| 3,777,331 | 12/1973 | Falborg . | |
| 3,808,638 | 5/1974 | Kupcikevicius et al. . | |
| 4,028,775 | 6/1977 | Tysver | 17/49 |
| 4,077,090 | 3/1978 | Frey et al. | 17/41 |
| 4,077,761 | 2/1977 | Beckman | 17/33 |
| 4,160,305 | 7/1979 | Tysver | 17/33 |
| 4,164,057 | 8/1979 | Frey et al. . | |

FOREIGN PATENT DOCUMENTS

| 988466 | 5/1976 | Canada | 17/49 |
|---|---|---|---|
| 90912 | 2/1962 | Denmark | 17/41 |
| 2853401 | 6/1980 | Fed. Rep. of Germany | 17/49 |
| 2853402 | 6/1980 | Fed. Rep. of Germany | 206/802 |
| 2099392 | 12/1982 | United Kingdom | 17/49 |
| 489685 | 1/1976 | U.S.S.R. | 53/576 |

*Primary Examiner*—Nicholas P. Godici
*Assistant Examiner*—Kurt Rowan
*Attorney, Agent, or Firm*—John C. Le Fever

[57] ABSTRACT

Method and apparatus for automatically and continuously producing encased food product having a uniform diameter and flat ends.

28 Claims, 17 Drawing Figures

METHOD AND APPARATUS FOR USE IN AUTOMATICALLY AND CONTINUOUSLY MAKING SAUSAGES WITH FLAT ENDS

This application is a continuation of prior U.S. application Ser. No. 430,230 filing date 9-30-82.

FIELD OF THE INVENTION

This invention relates generally to the production of large sausage products, and, more specifically, to a method and apparatus useful in automatically and continuously producing such products with flat ends.

BACKGROUND OF THE INVENTION

Large sausage casings are generally manufactured from materials such as regenerated cellulose, or regenerated cellulose having fibrous webs embedded therein and are employed in the manufacture of large sausage products such as salami and bologna sausages, spiced meat loafs, cooked and smoked ham butts and the like. Such large sausage casings are produced in flat widths ranging in size from about 2 to 15 inches and range in length from about 14 to 72 inches and longer. The large sausage casings most commonly used for commercial production of large sausage products range in size from about 3 to 8 inches in flat width and from about 18 to 72 inches in length.

In recent years, methods and apparatus for automatically stuffing meats and food emulsions into casings in a continuous fashion have become well-known in the art. Such methods and apparatus are disclosed, for example, in U.S. Pat. No. Re. 30,390 and U.S. Pat. Nos. 4,077,090 and 4,164,057. Such methods and apparatus commonly employ shirred tubular cellulosic food casings as disclosed, for example, in U.S. Pat. Nos. 2,983,949 and 2,984,574 to Matecki.

In the production of a large sausage product, a large sausage casing is first gathered over the end of a stuffing horn and then stuffed with a food emulsion. The thusly stuffed and encased food emulsion is subsequently cooked or cured according to conventional processes. Many of these large sausage products are thereafter sliced and packaged into units of predetermined weight and slice count for retail sale. The slicing devices employed in such packaging operations are pre-set to yield a specific weight-by-slice count for use in obtaining unit packages of equal weight. Since a large sausage casing stuffed with a food emulsion has two generally hemispherical or rounded ends, these rounded ends are generally not used in producing equal weight packages and are reworked (i.e., recycled in the production of a subsequent batch of food emulsion).

In order to minimize the rework resulting from these rounded ends, many prior attempts have been made to flatten them by utilizing a variety of methods and apparatus. While such attempts have attained some degree of success, none has proved to be entirely satisfactory. For example, U.S. Pat. No. 3,808,638 discloses a method for producing large sausage products having one pre-flattened end. While this method reduces the sausage end rework by one-half, substantial rework is still present in the non-flattened end. As a further example, U.S. Pat. No. 3,777,331 discloses a method and apparatus for producing encased sausage with two flat ends whereby the end pieces are inserted in a non-fully automatic fashion. Such method and apparatus is limited to the use of continuous lengths of non-shirred casing, and does not lend itself to efficient commercial operation.

OBJECT OF THE INVENTION

It is an object of the present invention to provide a method and apparatus that is useful in continuously and automatically producing encased food products having a substantially uniform diameter and substantially flat ends using shirred casings, thereby avoiding or minimizing the rework associated with the rounded ends of conventional sausages.

This and other objects of the invention will become apparent from a reading of the specification.

SUMMARY OF THE INVENTION

In one aspect, the present invention encompasses a method for automatically and continuously producing encased food product having a substantially uniform diameter and substantially flat ends which comprises:

(a) mounting a shirred tubular casing article, including a plurality of flattening annular disks disposed inside a closed-end unshirred portion of said shirred tubular casing, onto a stuffing horn of a food stuffing apparatus;

(b) positioning a first flattening disk and an annular second disk of said plurality proximate to the closed end of said casing and the discharge end of said stuffing horn such that the flattening portions of said first and second disks are essentially perpendicular to the axis of said stuffing horn;

(c) discharging a pressurized food product from the discharge end of said stuffing horn between said first and second disks in an amount sufficient to form an encased food length between said first and second disks;

(d) gathering an unshirred portion of said casing at a point after the trailing end of the encased food length and closing the casing at said point to provide a fully closed encased food product having substantially flat ends;

(e) positioning a succeeding pair of annular flattening disks proximate to the discharge end of said stuffing horn such that the flattening portions of said third and fourth disks are essentially perpendicular to the axis of said stuffing horn; closing the succeeding casing length; and severing the fully closed encased food product; and (f) repeating steps (c) through (e) using said succeeding pair of disks instead of said first and second disks to form another encased food length.

In another aspect, the present invention relates to an apparatus for automatically and continuously producing an encased food product having a substantially uniform diameter and substantially flat ends comprising in combination: a frame; a stuffing horn assembly, including a support tube having an inlet end and a discharge end for conveying food product from a supply source, said support tube having a tube portion adapted to hold an unshirred portion of said shirred tubular casing article including a plurality of axially disposed flattening annular disks inside said unshirred portion of casing, said tube portion extending through the central holes of said annular disks; means for advancing selected ones of said flattening annular disks to said discharge end and thereafter introducing a food product to be stuffed between said flattening annular disks; and control means operatively associated with said stuffing horn assembly to selectively control a cycle of successive stuffing and casing closing operations, including moving said disks off of said stuffing horn extension after the introduction of a food product therebetween, thereby producing an encased product having predetermined length and diameter with substantially flat ends, said flat ends being due to one of said annular disks being located proximate to and inside each end of said encased product.

In yet another aspect, the present invention relates to, in combination, an apparatus and article for automatically and continuously producing an encased food product having a substantially uniform diameter and substantially flat ends comprising in combination: a frame; a stuffing horn assembly including a support tube having an inlet end and a discharge end for conveying food product from a supply source, said support tube having a tube portion adapted to hold an unshirred portion of said shirred tubular casing article including a plurality of axially disposed flattening annular disks inside said unshirred portion of casing, said tube portion extending through the center holes of said annular disks; means for advancing selected ones of said flattening annular disks to said discharge end and thereafter introducing a food product to be stuffed between said flattening annular disks; and control means operatively associated with said stuffing horn assembly to selectively control a cycle of successive stuffing and casing closing operations including moving said disks off of said stuffing horn extension, thereby producing an encased product having predetermined length and diameter with substantially flat ends, said flat ends being due to one of said annular disks being located proximate to and inside each end of said encased product.

DESCRIPTION OF THE PREFERRED EMBODIMENTS

Figure 1:
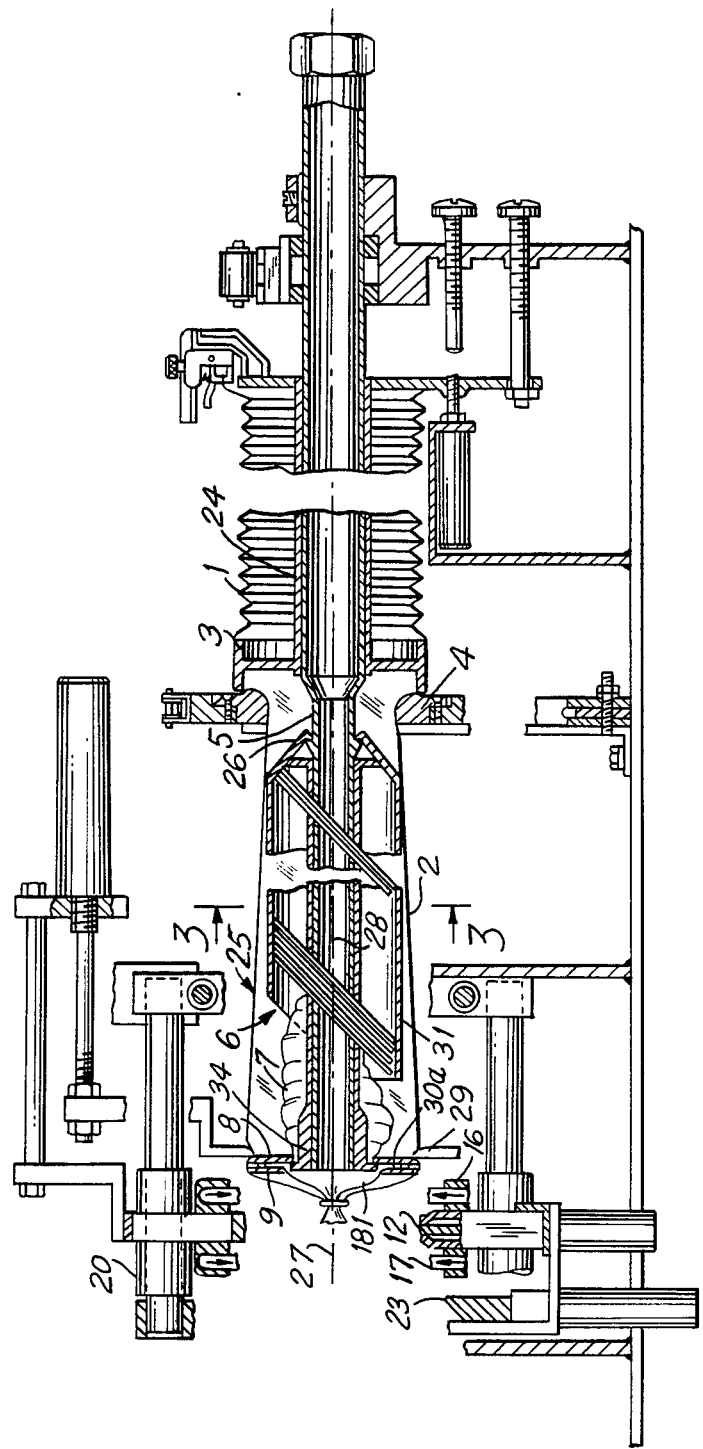
FIG. 1 is a sectional view of the stuffing apparatus of the invention equipped with a casing article for stuffing.

In a preferred aspect of the present invention, the above-mentioned plurality of flattening annular disks are arranged in the form of extender modules. An extender module comprises at least two flattening annular disks fixedly-attached by means of a flexible tubular membrane. Said modules in turn are detachably-attached one to another by virtue of direct or indirect contact between at least one annular disk of one module and at least one annular disk of an adjoining module.

At the point of detachable-attachment, it is preferred that the pair of disks include a leading annular disk (i.e., the disk that is to be placed in the leading end of the sausage product) that has a central hole larger in diameter than the central hole diameter of the trailing annular disk (i.e., the disk that is to be placed in the trailing end of the sausage product). This difference in hole size between the leading and trailing disks in the pair will facilitate detachment of the two disks at the outset of the stuffing cycle due to food emulsion pressure buildup between the two disks in the pair. In addition, a trailing disk having a smaller central hole can facilitate holding the trailing disk on the stuffing horn during stuffing operations while allowing the leading disk to move off the horn in response to the stuffing operation. Of course, if desired, the disks in the pair can have central holes that are of comparable diameters.

The flattening annular disks described above can perform a casing sizing function on the unstuffed casing as it deshirrs from the casing stick, as well as performing the flattening function on the stuffed casing at the ends of the encased food product. Generally speaking, at least some portion of the sizing function will be performed by one or more of the annular disks, either alone or co-acting with an optional sizing means, if used. Such optional sizing means may include, for example, sizing disks for stretch-sizing a shirred casing to insure proper and uniform stuffed casing diameters. These are well-known in the art and are disclosed, for example, in U.S. Pat. No. 4,007,761; 4,077,090; and 4,164,057 and U.S. Pat. No. Re. 30,390 and 30,265, incorporated herein by reference.

Any suitable holdback and/or sizing means such as means external to the unshirred portion of the casing, internal to said unshirred portion, and combinations thereof, may be used.

The apparatus and method of the present invention are suitably used to stuff so-called cored high density (CHD) shirred casings such as those disclosed in co-pending U.S. application Ser. No. 261,304, incorporated herein by reference. The CHD system involves flexible tubular cellulosic food casing shirred and compressed onto a rigid hollow tubular core to a high compaction condition to produce a casing stick with enhanced stuffing length capacity, structural stability and strength, and larger stuffing horn adaptability. In a preferred aspect, the sizing means employed in the present invention is molded to the tubular core of the CHD system.

The annular disks useful in combination with the method and apparatus are "flattening annular disks". The term is used to designate any disk which, when employed as an insert at either end of the stuffed sausage product, will flatten the end of such product, thereby avoiding or minimizing rework resulting from rounded ends. The flattening annular disks can have any of a wide variety of shapes and sizes including, for example, round, elliptical and polygonal-with-rounded corners, provided that these disks generally conform in outer perimeter to the inner perimeter of the casing of the package article. In this regard, it is important that a tight seal exist between the inner casing perimeter and the outer annular disk perimeter so that a seal may be maintained during the stuffing operation and subsequent handling of the food product.

Each of the annular disks must have an outer diameter that is less than the casing burst diameter for the casing. By "casing burst diameter" is meant a diameter that is excessive to the extent that the casing integrity is lost and there is at least one break-point in the casing.

When the annular disks are round in shape they should generally have a central hole diameter not exceeding 99 percent of the annular disk outer diameter, although it is preferred that the central hole diameter not exceed 90 percent (more preferably 50 percent) of the annular disk diameter. If the annular disks are not round, then the effective diameter of the central hole should preferably not exceed 90 (more preferably 50) percent of the effective outer annular disk diameter. When the central hole diameter of the annular disks approaches 99 percent of the annular disk outer diameter, the annular disks are properly envisioned as hoops. When using such hoops, they should be arranged in the form of the above-discussed extender modules. In the stuffed product, the hoops would coact with the flexible tubular membrane of the extender modules to prevent formation of hemispherical product ends and, instead, to provide conically-shaped substantially flat ends.

The central hole in the annular disks can also have a wide variety of sizes and shapes including, for example, round, elliptical and polygonal-with-rounded-corners. It is most preferable to have as small a central hole as possible in the annular disks since this will facilitate maximum flattening of the meat or meat-emulsion ends in the casing. Of course, the central hole in the annular disks cannot be smaller than the diameter of the stuffing horn, stuffing horn extension or support tube upon which the annular disks are mounted.

Detachable-attachment of the leading and trailing disks of each disk pair 30a, b, c, etc. can be effected by any suitable means such as, for example, metal or plastic tabs located around the inner or outer perimeter of one disk which co-act with a mating surface on an adjoining disk to form a disk pair. A preferred mode of detachable-attachment involves the use of metal tabs located around the outer perimeter of one annular flattening disk of the pair which interlocks with the other of the pair as hereinafter more fully described in connection with the drawings.

Fixed-attachment of the flexible tubular membrane to the annular disks of each extender module is preferably effected in proximity to the inner perimeter of each annular disk by any suitable means, such as by employing a food-acceptable metal-to-plastic adhesive or by crimping the inner perimeter of the disk around the flexible tubular membrane. If the crimping method is used, care must be taken to avoid tearing the membrane during the crimping process. In this regard, it has been found advantageous to employ a polyethylene string inside the crimp itself to act as a cushion during the crimping process, thereby minimizing the possibility of tearing the flexible tubular membrane, as disclose,d in co-pending application Ser. No. 430,229, incorporated herein by reference.

The flexible tubular membrane useful for fixed-attachment purposes is preferably a membrane constructed of a plastic film such as, for example, polyethylene film, polyvinyl chloride film, or ethylene vinylacetate film. It is preferred that the flexible tubular membrane occupy a minimum of space when fully collapsed in order to minimize the size of the disk array.

It has been stated above that the number of trailing and leading flattening annular disks in the package article be at least two. It is preferred that the number of disks be sufficient to provide sausages of a length required in any given commercial situation, taking into account the length of casing available on the shirred stick in the package article and the length of the encased stuffed product required for a particular commercial operation. The required number of disks will be readily apparent to one of ordinary skill in the art. In this regard, either the length of casing in the shirred stick can be varied based on a fixed number of disks or the number of disks can be varied based on a fixed shirred stick length. Typically, a casing having a stuffed diameter of about 4.5 inches and an unshirred casing length of 200 feet might employ 50 disk pairs.

The flattening annular disks useful in the present invention can be made of a wide variety of materials provided that the surface of the material chosen, or coating on the surface of the material, meet the required government specifications for use with food products. Useful materials would include metals such as aluminum and steel, and plastics such as polystyrene and polypropylene. It is preferred that the disks each be of sufficient strength to resist deformation in the stuffed product. The preferred disks of the present invention are those constructed from 75 lb. tin-plated steel having a thickness of about 0.007 inch and having stiffening annular ribs, such as those often found in can lids, for added support. The tin-plated steel may be appropriately coated with a chromate conversion coating or other coating meeting the required government specifications for use with food products.

The preferred aspects of the present invention are best described by reference to the attached set of drawings which in FIG. 1 shows a stuffing apparatus within the scope of the invention with a casing article 25 mounted thereon.

The casing article itself forms no part of the present invention and, is more particularly described in a U.S. Pat. No. 4,446,463 incorporated herein by reference. Briefly however, the article includes a shirred portion 1 of casing and an unshirred portion 2. Disposed within the unshirred portion 2 is an extender module magazine 6 which contains a plurality of end flattening disks moved by the stuffing apparatus into the ends of the stuffed products during an automatic stuffing operation. The unshirred portion 2 is pre-closed at its free end, preferably with a clip, and the pre-closure also closes an end of the flexible tubular membrane 181 at the point of pre-closure. The extender modules, while briefly described hereafter are more particularly described in U.S. Pat. No. 4,446,985 incorporated herein by reference.

While FIG. 1 shows the stuffing apparatus of the present invention, it should be understood that only those components essential to an understanding of the invention are shown. Other conventional components are omitted or only briefly described as they would be readily apparent to one skilled in the art.

Figure 9B:
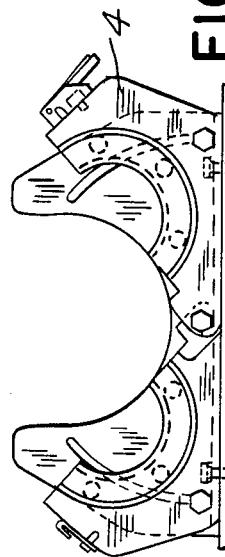
FIG. 9 is an open and closed view of a split pressure (snubbing) ring.
Figure 9A:
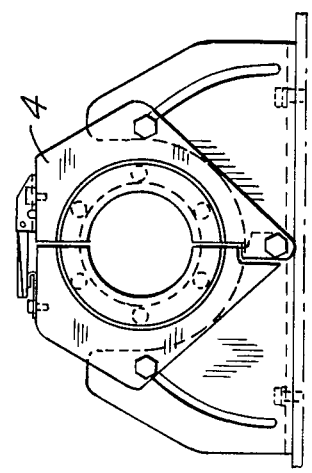

The stuffing apparatus is seen to include a clipper carriage 20 which includes means for closing and severing the ends of the casing stuffed products as they are formed. The structure and function of this carriage is conventional. Also conventional is the support sleeve 24 and a pressure ring 4 shown more clearly in FIG. 9 in the non-conventional form of a split pressure ring 4. These components, except for the split version of ring 4, are all more particularly described in U.S. Pat. Nos. 4,077,090, 4,164,057 and U.S. Pat. No. Re. 30,390, the disclosures of which are incorporated herein by reference.

The stuffing apparatus also includes a split emulsion sealing ring 23 and an extender positioning means 29. The split emulsion sealing ring 23 is adapted to seal around the outer periphery of a trailing end flattening disk during the stuffing operation as described hereinbelow. It also moves the trailing end disk off of the stuffing horn after the stuffed product is formed so that a clipper device 17 can close the casing over the rear of this trailing disk.

Positioning means 29 is movable along a path parallel to the axis of the stuffing horn. This positioning means is shaped as an elliptical crescent so as to fit over the slanted annular end flattening disks in the extender module magazine 6. However, as these disks are moved towards an upright position during the automatic stuffing operation, they can be engaged by the positioning means.

FIG. 1 shows the clipper carriage 20 moved to a transverse loading position. The shirred stick 1 portion of the prepackaged shirred tubular casing article 25 is placed on the support sleeve 24, and the sizing means 3 is attached to the support sleeve via the "fingers" of sizing disk 3 as is known in the art (see U.S. Pat. No. Re. 30,265). The extender module magazine 6 portion of the prepackaged shirred tubular casing article 25 is attached to the stuffing horn extension 5 via a quick-connection fastening means 26 as shown in FIGS. 1 and 4.

Figure 3:
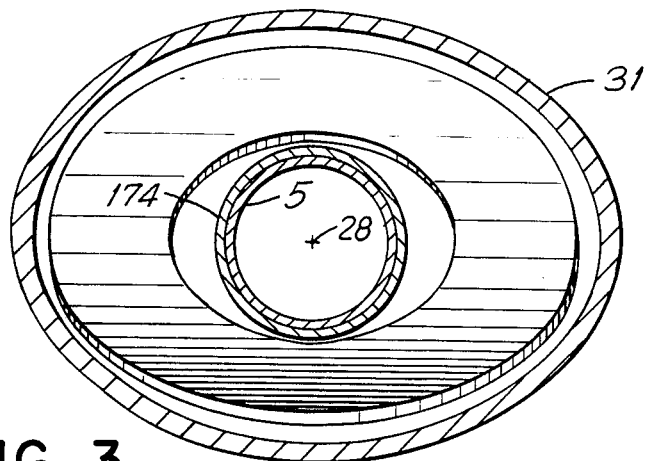
FIG. 3 is a cross-sectional view of an extender module magazine.
Figure 4:
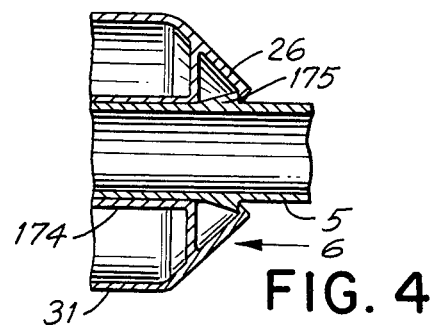
FIG. 4 is a close-up view of a quick-connection attachment for connecting an extender module magazine to the stuffing horn of the stuffing apparatus.

Referring to FIG. 4 there is disclosed an extender module magazine 6 mounted on stuffing horn extension 5. Magazine 6 comprises magazine outer sleeve 31 (also shown in FIG. 3), which encloses an array of extender modules (not shown) which are mounted on a central support tube 174. The magazine 6 also comprises fastening means 26 whereby the magazine is fit in place on stuffing horn extension 5 by snapping into a locking position behind ramped elements 175 of said stuffing horn extension.

The clipper carriage 20 is then moved transversely to the "operate" position (i.e., the central axis 27 of the emulsion seal ring 23 is aligned with the central axis 28 of the stuffing horn extension 5). The split pressure ring 4, similar to the convoluted snubbing ring disclosed in U.S. Pat. Nos. 4,077,090 and 4,164,057, but split in order to facilitate loading of casing on the stuffing horn, is closed (see FIG. 9) over the unshirred length of casing just forward of the sizing means 3. At this point, the clipper carriage 20 is in its forward (or reset/clip) position (see FIG. 1), the emulsion seal ring 23 is open, and the elliptical extender positioning ring 29 is up against a first extender pair 30a positioned at the end of a nose piece 34 on the end of support tube 174.

Figure 5:
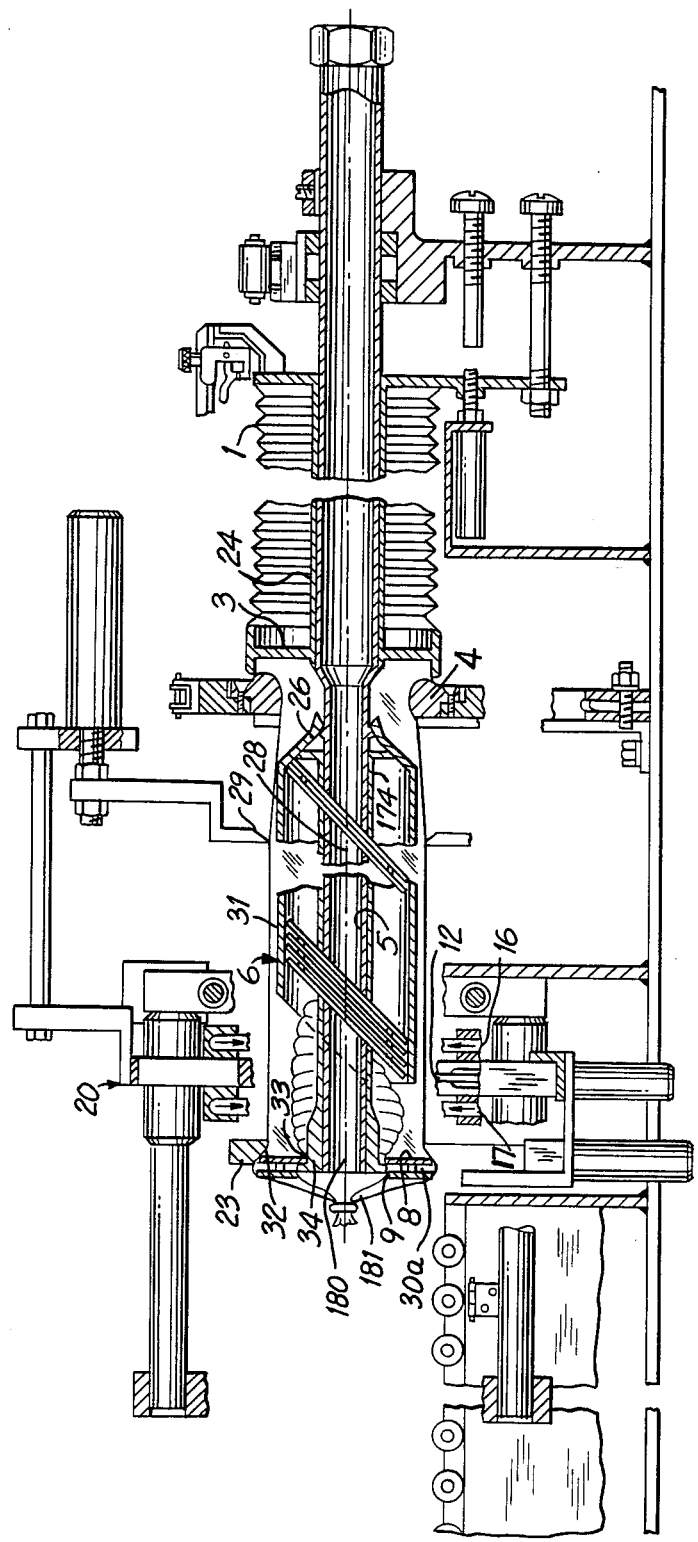
FIGS. 5 to 8 are views of the stuffing apparatus during various stages of the stuffing operation.

The machine cycle is then initiated. The clipper carriage, including the emulsion seal, moves to the stuff position (see FIG. 5) as the positioning means 29 is retracted rearward over the extender module magazine sleeve 31. The emulsion seal ring 23 then closes over the first disk pair 30a (as shown in FIG. 5).

Emulsion sealing is effected by the coaction of the outer periphery 32 of the trailing disk 8 of the leading disk pair 30a with the emulsion seal ring 23, and by the coaction of the inner periphery 33 of the trailing disk 8 of the leading disk pair 30a with the nose piece 34 of the extender module magazine 6. The emulsion pump is then activated.

Figure 6:
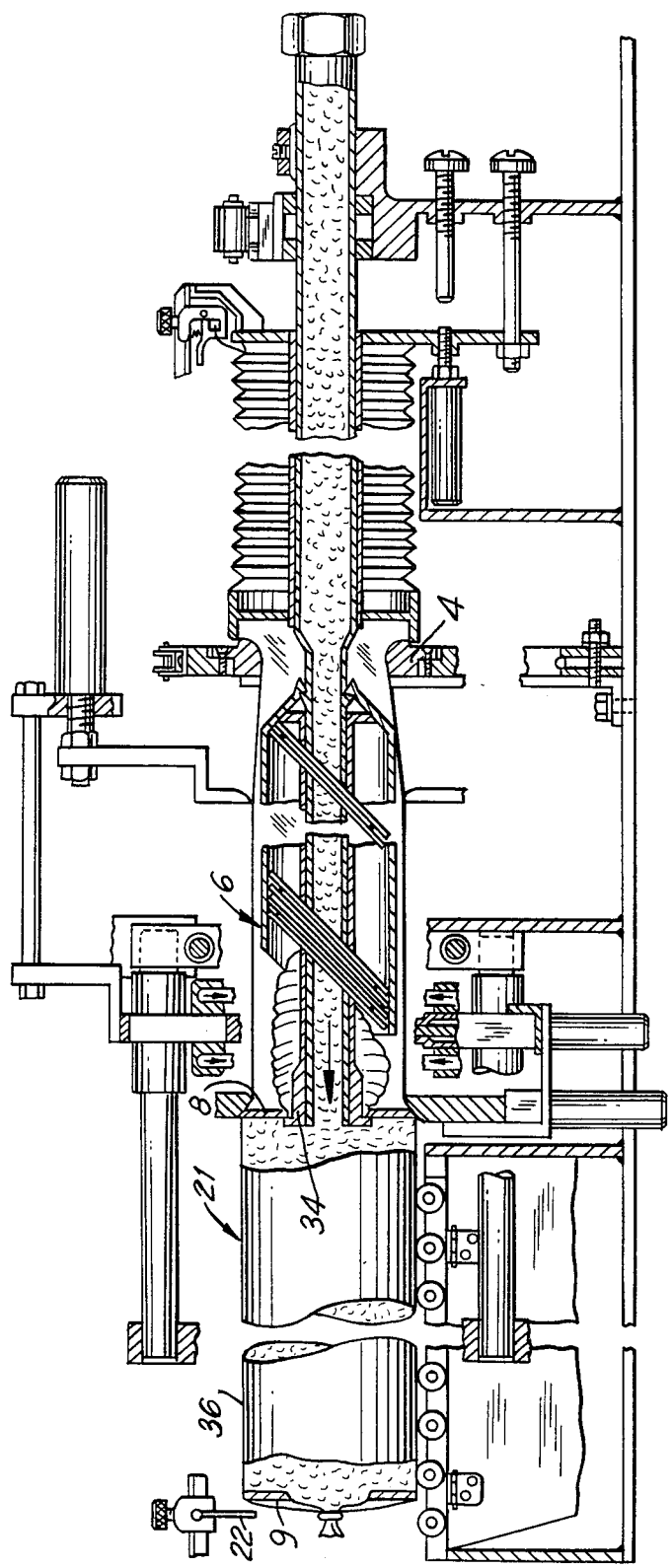

Product emulsion flows through the stuffing horn into the pocket 180 confined by the pre-clipped tubular membrane 181 and into the space between the leading and trailing disks 9, 8 respectively. Emulsion pressure separates the leading disk 9 from the trailing disk 8 of the disk pair 30a and stuffing proceeds (FIG. 6) thereby forming a stuffed product 21. In an alternate embodiment, when stuffing chunk food product instead of food emulsion, mechanical means is envisioned to effect separation of the disks of disk pair 30a. Casing diameter control during stuffing is provided with casing snubbing achieved through the coaction of split pressure ring 4 and sizing means 3 as shown in FIG. 6 and as is conventional in the art (see U.S. Pat. Nos. 4,077,090 and 4,164,057, both incorporated herein by reference).

Figure 7:
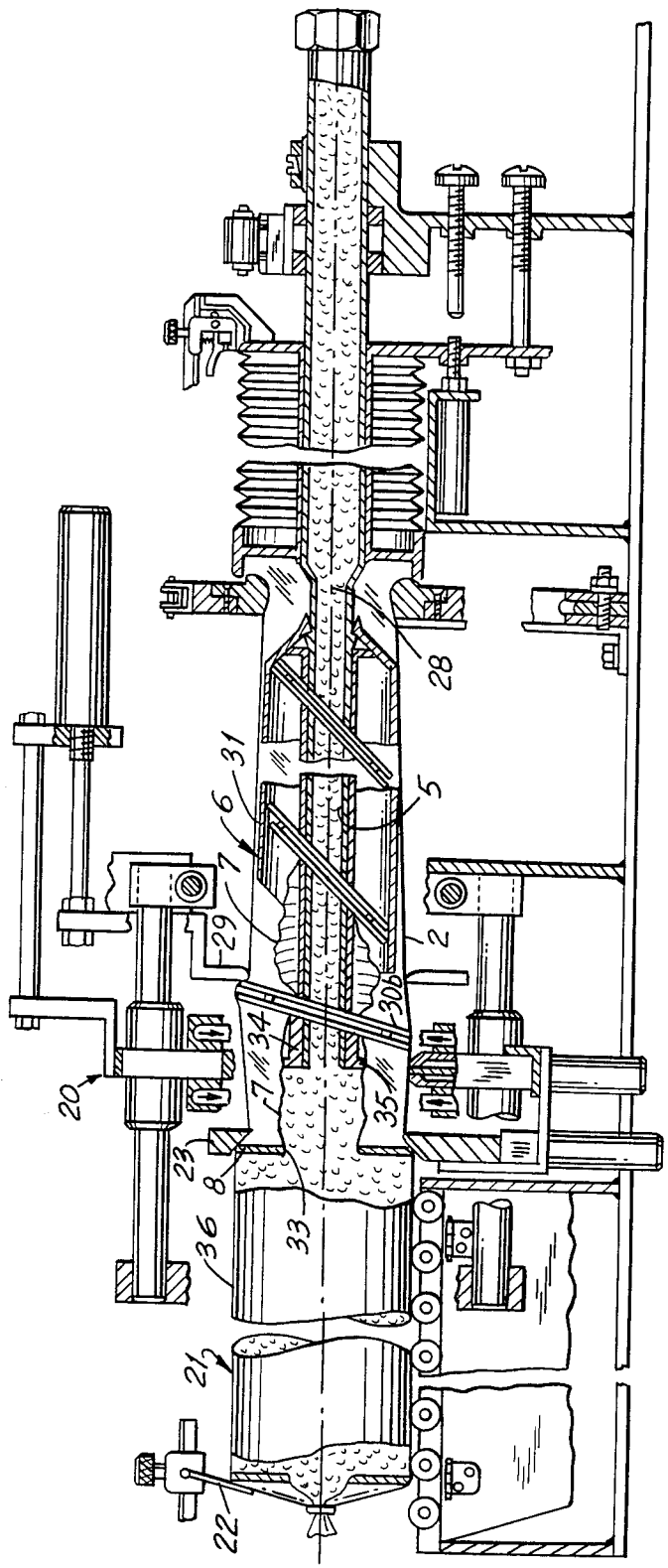

When the leading end of the stuffed product 21 contacts the product length sensor 22 (see FIG. 7), the emulsion pump is stopped. The clipper carriage 20, including emulsion seal 23, then moves to its most forward position, advancing with it the stuffed product 21 by detaching the trailing disk 8 from the nose piece 34 by the forced passage of the trailing disk 8 over the flexible flange 35 of said nose piece 34. The flexible flange 35 of the nose piece 34 is designed to flex sufficiently, or alternatively, the trailing disk 8 is designed to have an inner periphery that will flex sufficiently, to allow passage of trailing disk 8 over the flexible flange 35 when the trailing disk 8 is subjected to a sufficiently large axial force. This axial force is supplied as carriage 20 moves forward.

The forward motion of the trailing disk 8 (now an integral part of the stuffed product 21) pulls the next disk pair 30b partially free from the sleeve 31 of the extender module magazine 6. This is due to the flexible membrane 7 which connects the trailing disk 8 of disk pair 30a, with a leading disk of the next disk pair 30b. This connection as well as the structure and detachable attachment of a trailing disk 8 to a leading disk 9 is further described hereinbelow.

As this next disk pair 30b is pulled free from the magazine 6, the positioning means 29 is moved axially forward to "pick up" said next disk pair 30b (FIG. 7), acting externally to the unshirred casing 2 within which said next disk pair 30b is enclosed. The positioning means then moves (or "escorts") the disk pair 30b into proper position on the extender module magazine nose piece 34.

Figure 2:
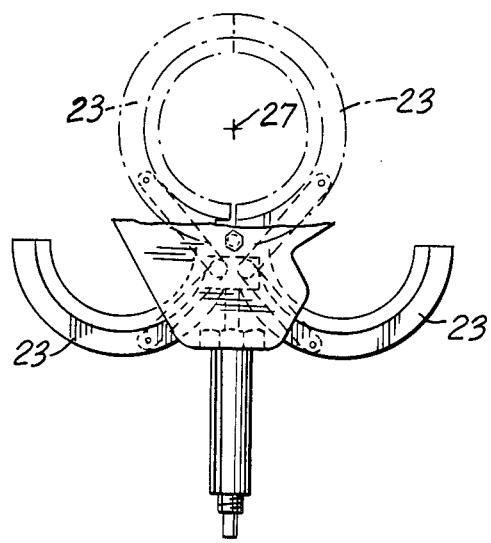
FIG. 2 is a view of the emulsion seal means useful in the invention.
Figure 8:
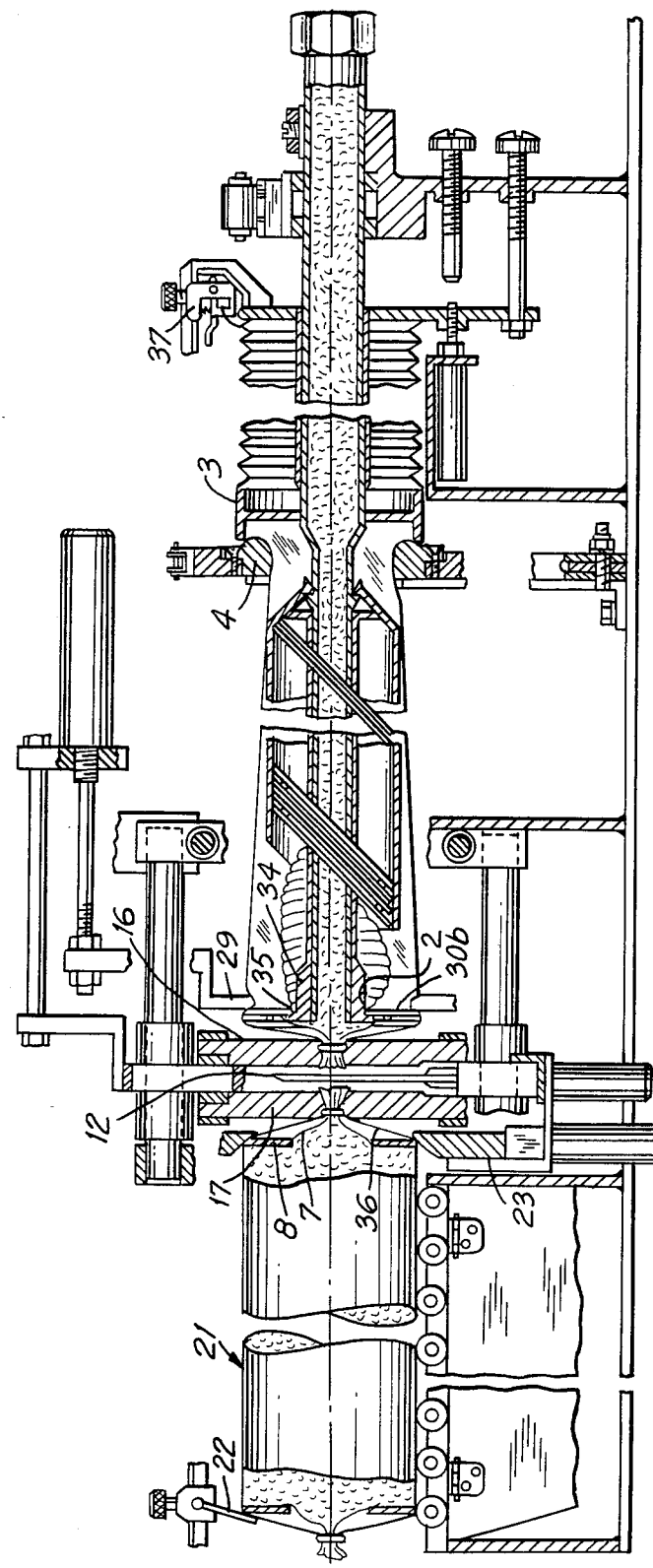

As this next disk pair is moved forward towards the nose piece 34 by the disk positioning means 29, it is simultaneously straightened so that its proper final angular position is attained (i.e., the plane of the disk pair 30b in position for commencement of a stuffing cycle, as shown in FIG. 5, must be normal to the axis 28 of the stuffing horn extension 5). With the positioning means 29 holding the new disk pair 30b tightly against the flexible flange 35 of the extender module nose piece 34, the clip and sever sequences are initiated (see FIG. 8). A forward clip closing means 17 and a rear clip closing means 16 are activated simultaneously. Clipping takes place over the emulsion-filled flexible tubular membrane 7 connecting the trailing disk 8 of the finished product 21 and the new disk pair 30b. The outer casing 36 of the stuffed product 21 is clipped together with the tubular membrane 7 by the forward clip-closing means 17. In like manner, the outer empty unshirred casing 2 is clipped by the rear clip-closing means 16 together with tubular membrane 7 at a point aft of the clip applied by the forward clip-closing means 17. Severing takes place between the clips, immediately after said clips are in place, by a casing severing knife 12. Emulsion is removed from the severing area of the membrane by the squeezing action of the clip-closing means 16 and 17. The clip-closing means 16 and 17 are then opened, and the casing severing knife 12 is retracted. The emulsion seal ring 23 is opened, as shown in FIG. 2, in preparation for the next operating cycle. The machine now proceeds to its next cycle. Stuffing continues by automatically repeating the full cycle of operations until the end-of-casing sensor 37 senses depletion of the shirred casing supply and terminates automatic machine action.

The package article of the present invention is suitable for use with the so-called cored high density (CHD) system as set forth in co-pending U.S. application Ser. No. 261,304, incorporated herein by reference. The CHD system involves flexible tubular cellulosic food casing shirred and compressed onto a rigid hollow tubular core to a high compaction condition to produce a casing stick with enhanced stuffing length capacity, structural stability and strength, and larger stuffing horn adaptability. In a preferred aspect, the sizing means employed in the present invention is molded to the tubular core of the CHD casing article. The tubular core of the CHD casing article is a support sleeve which can also act as the stuffing horn itself or as a tension sleeve as disclosed in U.S. Pat. No. Re. 30,390. If the tubular core is used as the stuffing horn it may require support at the stuffing end in order to insure stability and prevent flopping.

Figure 10:
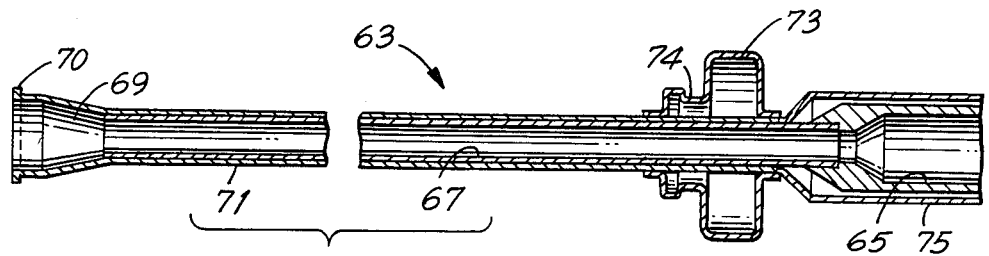
FIG. 10 is a profile view of a particularly preferred single-piece support tube configuration useful in the invention as mounted on a stuffing horn apparatus.
Figure 11:
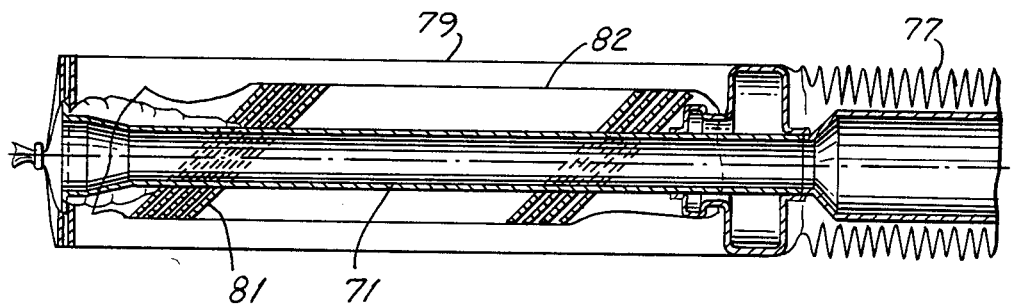
FIG. 11 is a sectional view of a package article incorporating the single-piece support tube configuration of FIG. 10.
Figure 12:
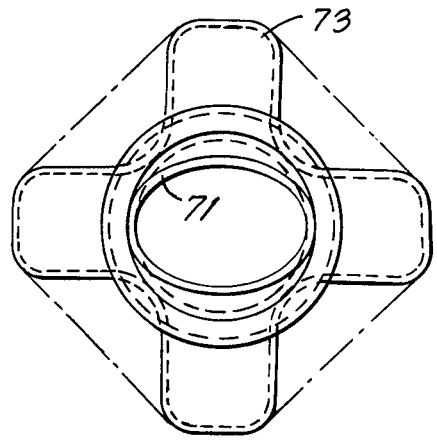
FIG. 12 is a vertical cross-sectional view of a preferred clover-leaf design sizing means useful in the package article of the invention.

An alternate and preferred embodiment useful within the scope of the present invention is shown in FIG. 10 wherein a single-piece support tube 63 is shown fit over the stuffing horn 65 and stuffing horn extension 67. The single-piece support tube comprises a conical nose piece 69 having a flexible end lip 70, an elliptical disk support piece 71, a sizing means 73, and a disk array overwrap tie-down slot 74 all fit together with a CHD tubular core 75 to provide strength and coherency advantages that are associated with single piece construction. FIG. 11 shows a package article utilizing the above-discussed single-piece support tube having a shirred casing stick 77 and an unshirred casing length 79 containing a disk array 81 and a disk array overwrap 82, all mounted thereon. A preferred sizing means 73 having a cloverleaf design is shown in FIG. 12. A detailed description of this type of sizing means is given in co-pending application 430,982. In brief, this type of sizing means cooperates with the casing to stretch-size the casing into the recesses and over the lands of the clover leaf to provide the desired effective diameter.

The disk array 81 is preferably canted for use during stuffing as shown in FIG. 11. Since the casing to be stuffed will have an inner diameter approaching the outer diameter of the disk array 81, the canting will allow the casing to be drawn over the disk array and its overwrap 82 during the stuffing operation with minimal drag. Canting also allows the support tube 63 and the stuffing horn extension to be generally elliptical in vertical cross-section (see FIG. 12) because the projection of the round, but canted, central holes of the disk array 81 onto a plane normal to the stuffing horn axis 1 will be an ellipse. This elliptical shape for the stuffing horn affords maximum emulsion throughput during stuffing. This elliptical shape is presented more clearly in FIG. 3 which shows a cross-sectional view of an extender module magazine. Magazine outer sleeve 31 is shown in FIG. 3 as having an elliptical shape to conform to the shape of the canted extender modules. The possibility of using an elliptical shape for the central support tube and the stuffing horn is also illustrated in FIG. 3 by virtue of the projected shape of the canted disk central hole.

Figure 13:
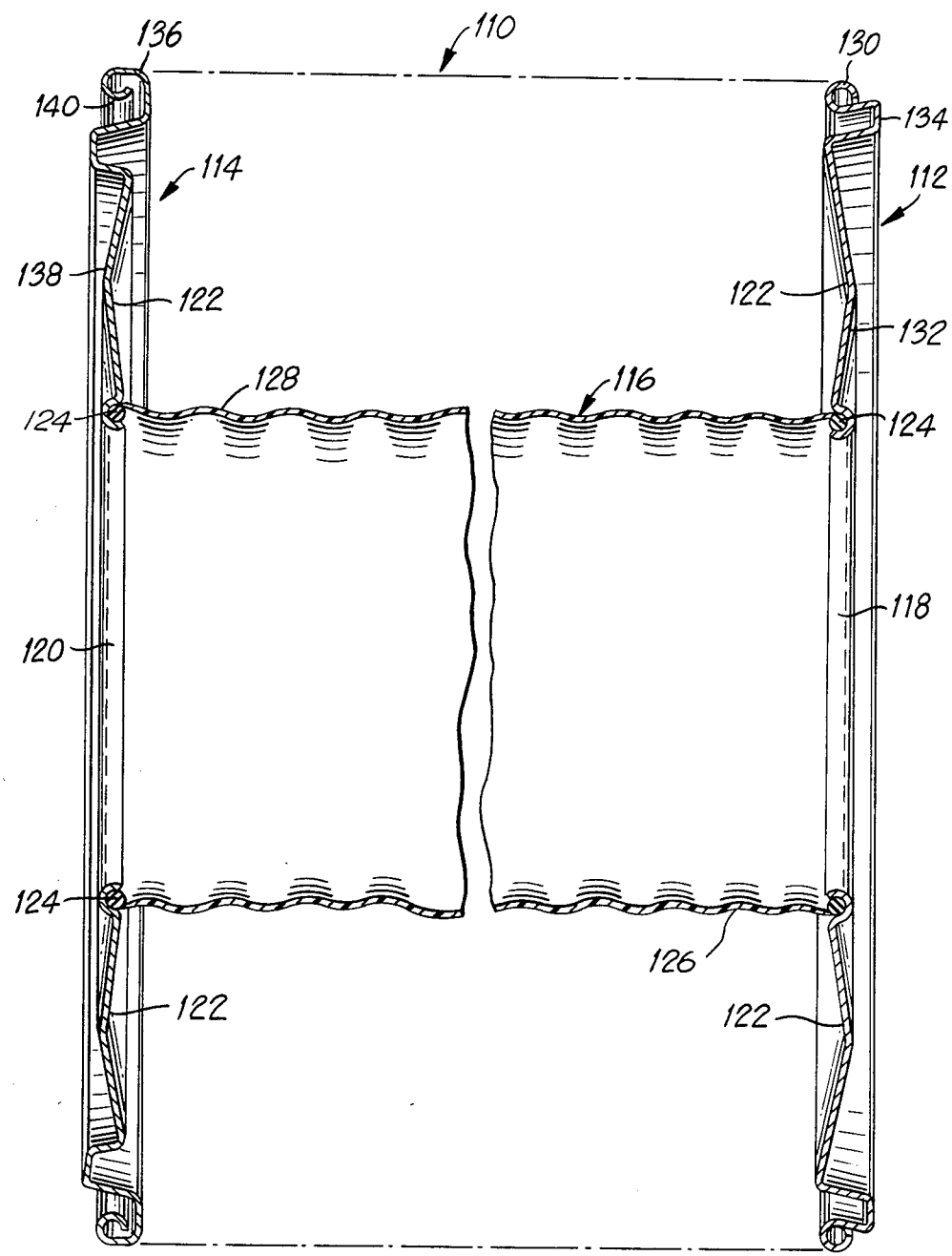
FIG. 13 is a sectional view of a preferred arrangement for the annular disks useful in the invention whereby two disks are fixedly-attached by means of a flexible tubular membrane.

FIG. 13 shows two flattening annular disks useful in the present invention, fixedly-attached as generally indicated at 110 (hereinafter called an "extender module"), which can be adapted for use in the automatic production of large sausage products having flat ends. The extender module 110 includes a leading disk 112 and a trailing disk 114 connected by a flexible tubular membrane 116.

The terms "leading" and "trailing" as applied to the disks, denotes whether the particular disk forms the leading end, or the trailing end respectively, of a stuffed product. Thus, with reference to the extender module 110 as shown in FIG. 13, trailing disk 114 will go to form a flat trailing end of a first stuffed product during the stuffing operation while leading disk 112 will go to form a flat leading end of the next stuffed product.

Each disk 112, 114 as shown in FIG. 13, is generally the shape of a substantially flat, annular disk. Preferably, the central opening 118 in leading disk 112 is larger in diameter than the central opening 120 in trailing disk 114 for purposes set out herein below.

Also, it is preferred that each opening 118, 120 be as small as possible as this will facilitate maximum flattening of the ends of the stuffed product. Since in a preferred embodiment, both disks will be located on a stuffing horn assembly, the size of the opening 118, 120 should be sufficient to allow passage of the disks over the stuffing horn. However, in an alternate embodiment, one disk in the array (i.e. the very first disk) will have no hole.

Each disk 112, 114 is preferably slightly dished about its opening as shown at 122. In part, this strengthens each disk and helps to prevent deformation in use. The portion of each disk about openings 118, 120 is also bent inward and formed about a core 124 of polyethylene or other suitable, relatively resilient material, as more fully described in co-pending U.S. application Ser. No. 430,229. Captured between each core and the material of the disk as formed about these cores, are the respective ends 126, 128 of the tubular membrane 116. In this fashion the tubular membrane defines a tubular passage having one end 126 defined by opening 118 in the leading disk 112 and its second end defined by opening 120 in the trailing disk 114.

Leading disk 112 has a bead or rim 130 formed about the outer periphery to add strength and rigidity to the disk. Since, in use, disk 112 will be disposed within a stuffed casing, the bead also will help to prevent the disk from damaging the casing during the stuffing process as the casing is stretched over the bead to effect a seal between the inner perimeter of the casing and the outer perimeter of the leading disk 112.

Formed on the rear, or outwardly facing surface 132 of leading disk 112, is an annular shoulder 134. This shoulder is disposed about the leading disk adjacent its outer periphery for purposes set out hereinbelow.

As shown in FIG. 13, the trailing disk 114 has its outer periphery formed with a flange 136 that is bent or rounded over the front or leading face 138 of the disk. This configuration provides the rim of the trailing disk 114 with a rounded surface so that in use, a casing can be stretched over the trailing disk to effect a seal similar to the seal between the casing and the leading disk. This configuration also provides an annular lip 140 which extends about the periphery of the trailing disk. This lip is not continuous but has pieces removed so as to form a plurality of tabs 140, spaced about the periphery of the trailing disk.

Tabs 140 on the trailing disk 114 and the shoulder 134 on the leading disk 112 are coincident, and the respective sizes of shoulder 134 and tabs 140 are such that the shoulder can snap-fit under the tabs. With this arrangement, a leading disk 112 of one extender module can be detachably connected to the trailing disk 114 of a second extender module simply by aligning the respective leading and trailing disks and then snapping shoulder 134 beneath tabs 140 as shown in FIG. 14.

Figure 14:
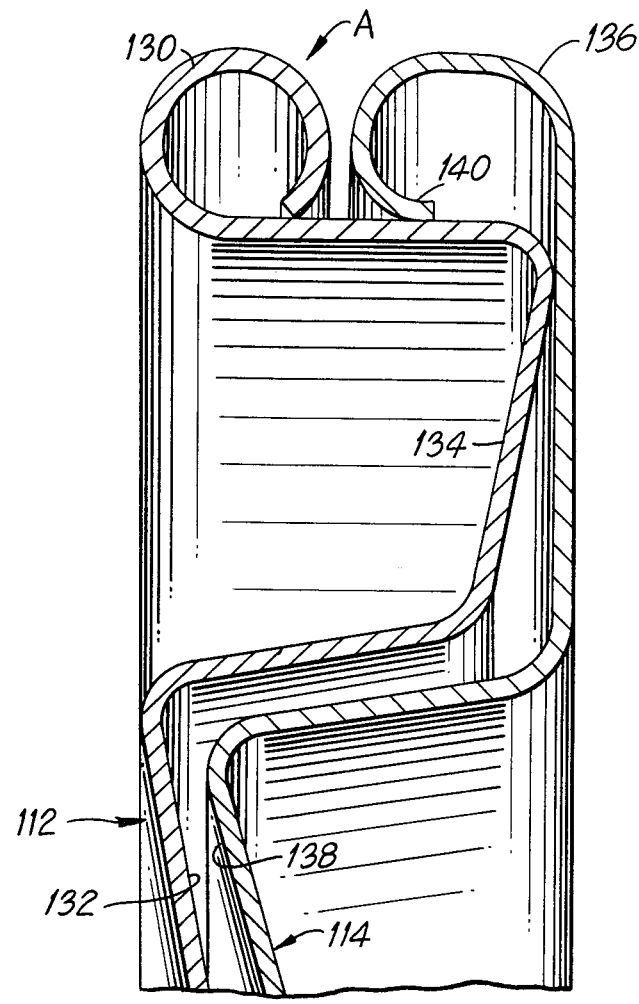
FIG. 14 is a cut-away view of a disk pair showing a preferred means of detachable-attachment for the disk pair.
Figure 15:
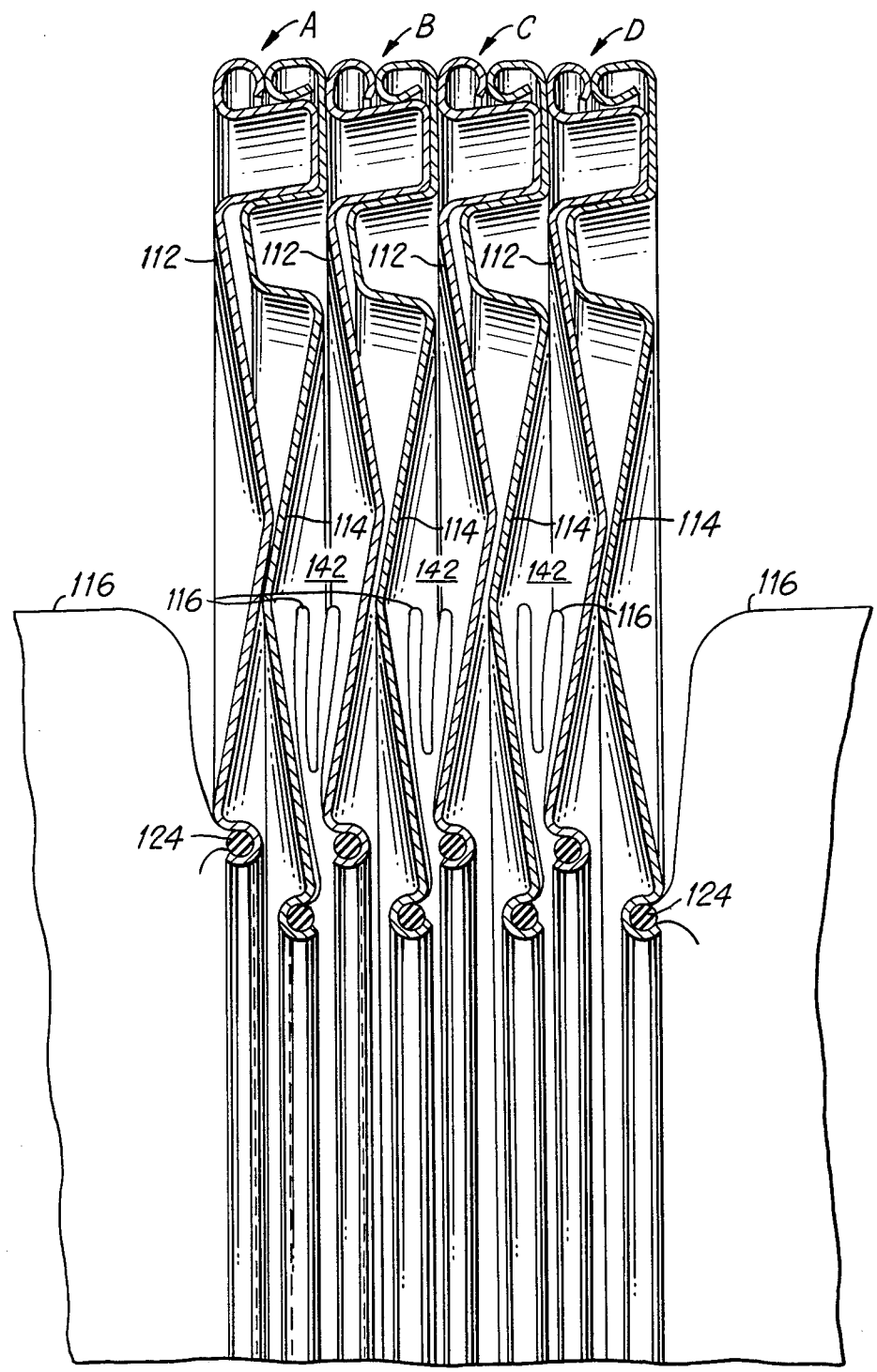
FIG. 15 is a sectional view of an array of disk pairs.

For purposes of describing the present invention, a leading and a trailing disk which are detachably connected together as shown in FIG. 14 will be referred to as a disk pair and will be identified by letters A, B, C, etc. Thus, FIG. 14 shows a disk pair A formed by detachably connecting a leading disk 112 of one extender module 110 (FIG. 13), to the trailing disk 114 of another identical extender module. In this fashion, any number of extender modules 110 can be detachably connected to form an ordered array of disk pairs A, B, C, etc., each disk pair being connected to the following disk pair by flexible tubular membrane 116. Such an arrangement is shown in FIG. 15. It also should be appreciated that the leading extender 112 of the first extender pair A in an ordered array could be a solid disk. That is, the central opening 118 could be omitted from the leading extender of this pair.

FIG. 15 shows four disk pairs A, B, C and D connected one to another by tubular membranes 116. It should be understood that four disk pairs are shown for purposes of illustration only and that any number of extender modules 110 can be connected as may be needed. Moreover, since tubular membrane 116 is flexible, the disk pairs A, B, C and D can be collapsed axially one against the other to form a relatively compact, ordered array of disk pairs. When the disk pairs are collapsed together, the dished configuration of each leading and trailing disk 112, 114 respectively, as described herein above, provides a space 142 to accommodate the tubular membrane 116 which folds into this space.

Figure 16:
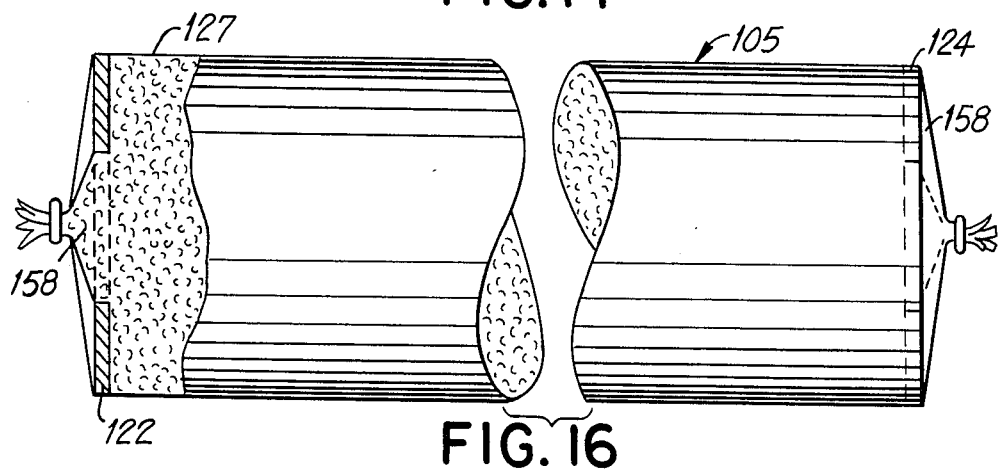
FIG. 16 is a view of a sausage product produced using the package article of the invention.

FIG. 16 shows a sausage 105 produced using the package article of the present invention. The sausage 105 is encased by casing 127 and is shown with substantially flat ends produced by flattening annular disks 122, 124. The emulsion contained in pockets 158 must be reworked. It should be noted, however, that the rework contained in the pockets is substantially minimal as compared to that found in the rounded ends of the prior art sausages, as discussed in the following example.

In an alternate embodiment, the apparatus disclosed in U.S. Pat. No. Re. 30,390, incorporated herein by reference, may be modified to provide the desired product with substantially flat ends. Such modification involves among other things: (1) fixing the support sleeve of the stuffing machine shown in that reissue patent in place on the stuffing horn so that the sleeve does not move during the stuffing operation; (2) rendering the sizing disk of the stuffing machine shown in that reissue patent unmoveable on the stuffing horn; (3) employing a sizing disk that is small enough to impart a degree of casing stretch-sizing, when used in conjunction with the snubbing means disclosed in U.S. Pat. No. 4,077,090 while permitting casing slacking when required during the stuffing cycle; and, (4) rendering said snubbing means slideable during the stuffing operation to provide effective casing stretch-sizing in conjunction with the sizing disk.

Operation and control of the apparatus described above can be effected using pneumatic motive means. Alternately, electro-pneumatic means can be employed. Typically, a plurality of motor-driven cam-operated timing switches can be used to control the sequential operations of stuffing, closing and severing of the casing.

The following example is intended to illustrate, but in no way limit, the scope of the present invention.

EXAMPLE

In order to show the improvement associated with the article of the present invention, a conventional stuffing apparatus of the type shown in U.S. Pat. No. Re. 30,390 and sold by Union Carbide Corporation as a Model 400 F SHIRMATIC stuffing apparatus, was modified as described above and as shown in FIG. 1. An extender package article as shown in FIG. 1 was mounted to the modified apparatus and the modified apparatus operated continuously and automatically to produce stuffed products having substantially flat ends.

As a control, a similar but unmodified apparatus, as disclosed in U.S. Pat. No. Re. 30,390, was operated in a conventional manner to produce stuffed products having conventional rounded ends. Control products were made using a SHIRMATIC shirred casing article as disclosed in U.S. Pat. No. 4,007,761, incorporated herein by reference.

Both runs utilized a SHIRMATIC clear, size 7-1/2K casing and each apparatus was adjusted to stuff the casings to the manufacturer's recommended "green" (i.e., unprocessed) diameter of about 4.62 inches. Also, a similar meat bologna emulsion was utilized for each run.

Fourteen stuffed products were then made using the modified apparatus and thirteen using the conventional apparatus. Measurements taken about the midpoint of each product were uniform, and midpoint diameters for each product averaged 4.63 inches.

After stuffing, all products underwent similar processing in a smoke chamber and were stored at 30° F. for 24 hours to produce the finished products for slicing.

Each product was sliced using a deli-type sausage slicing machine set to produce a slice 0.17 inches thick. Both the leading and trailing end of each product was sliced until the mean slice diameter approached 4.44 inches for the leading end and 4.52 inches for the trailing end.

An average of 13 slices were cut from each end of the conventional products before approaching the finished mean diameters as set out above. In comparison, only an average of 1.5 slices were taken from each end of the flat ended products made using the extenders and modified stuffing apparatus as described herein.

The weight of the individual slices and the combined total weight for slices from both ends of each product were recorded. This data indicated that the average amount of rework for each product having the conventional rounded ends totaled 833 grams. In contrast, the weight of the rework from the flat ended stuffed products averaged only 102 grams. The rework from the flat-ended product was only 11.6% of the rework from the conventional round-ended product.

To confirm the overall uniformity of the finished product diameter of the flat ended stuffed products, an additional six slices were taken from the end of each product. The mean diameter and weight of each of these additional slices were uniform and within acceptable limits for commercial packaging in weight-by-slice count packages.

The eight-fold decrease in rework and the slice count increase from each product, as demonstrated by this test, established that the method and apparatus of the present invention are suitable for use in the continuous and automatic production of stuffed products having substantially flat ends.

We claim:

1. A method for automatically and continuously producing encased food product having a substantially uniform diameter and substantially flat ends which comprises:
   (a) mounting a shirred tubular casing and a plurality of flattening annular disks each with a central hole onto a stuffing horn of a food stuffing apparatus, said shirred casing having a closeable unshirred portion extending over the discharge end of said stuffing horn, said stuffing horn extending through said disk central holes and said disks being disposed inside said closeable unshirred portion of said shirred tubular casing;
   (b) positioning a first leading flattening disk and a second trailing flattening annular disk of said plurality within the unshirred portion portion of said casing and proximate to the discharge end of said stuffing horn such that the flattening portions of said first and second disks are essentially perpendicular to the longitudinal axis of said stuffing horn;
   (c) discharging a pressurized food product from the discharge end of said stuffing horn between said first and second disks in an amount sufficient to move said first leading disk away from said stuffing horn and form an encased food length between said first and second disks;
   (d) moving said second disk off said stuffing horn, and gathering and closing an unshirred portion of said casing between the annular second disk and the stuffing horn discharge end to provide a fully closed encased food product having substantially flat ends;
   (e) positioning a succeeding pair of said annular flattening disks proximate to the discharge end of said stuffing horn such that the flattening portion of each disk of said succeeding pair of said disks is essentially perpendicular to the longitudinal axis of said stuffing horn, and severing the fully closed encased food product from the casing remaining on the stuffing horn; and
   (f) repeating steps (c) through (e) using said succeeding pair of disks instead of said first and second disks to form another encased food length.

2. The method of claim 1 which includes continuing the cycle of steps (c) through (f) in an automatic and continuous manner until the casing or annular disks are expended.

3. The method of claim 1 wherein said second annular disk has an outer perimeter greater than the unstretched inner perimeter of the casing when placed in a position essentially perpendicular to the axis of said stuffing horn prior to step (c), thereby performing at least a partial casing sizing function for the unshirred portion of said casing.

4. The method of claim 1 wherein each of said annular disks has an outer diameter less than the casing burst diameter for said casing.

5. The method of claim 1 wherein the diameter of the central hole in each of said annular disks does not exceed 90 percent of the annular disk outer diameter.

6. The method of claim 1 which includes stretch sizing said unshirred portion of said casing.

7. The method of claim 1 wherein said first flattening disk is an annular disk or a solid disk.

8. The method of claim 1 wherein said mounting of said casing and said disks is performed simultaneously.

9. The method of claim 1 wherein said mounting of said casing and said disks is performed sequentially.

10. The method of claim 1 wherein step (a) includes mounting a casing sizing means about said stuffing horn between said shirred tubular casing and the plurality of flattening annular disks.

11. The method of claim 1 wherein the step (d) moving of said second disk off the stuffing horn and the step (e) positioning of the succeeding pair of disks are performed simultaneously.

12. The method of claim 1 wherein said flattening annular disks are detachably-attached in pairs, each disk of the pair being fixedly-attached by means of a flexible tubular membrane to a disk of an adjoining pair.

13. The method of claim 12 wherein said pairs each have a leading and a trailing annular disk, said leading annular disk having a central hole with a diameter larger than the diameter of the central hole of the trailing annular disk in the pair.

14. The method of claim 13 wherein the leading annular disk is positioned forward of the discharge end of said stuffing horn during step (e) and the trailing disk remains on said stuffing horn until step (d).

15. The method of claim 12 including gathering and closing said tubular membrane together with said unshirred portion of casing during step (d).

16. The product produced by the method of any of claims 1 through 15.

17. An apparatus for automatically and continuously producing an encased food product having a substantially uniform diameter and two substantially flat opposite ends comprising:
   (a) a stuffing horn through which the product to be encased is expressed;
   (b) means to mount a shirred tubular casing and a plurality of flattening annular disks on said stuffing horn, said disks being disposed inside an unshirred portion of said casing, said disks each having a central hole and said disks being arranged so that the longitudinal axis of said horn extends through said disk central holes; and,
   (c) positioning means axially moveable with respect to the longitudinal axis of said stuffing horn for engaging and axially moving disks from said plurality to a position proximate to the discharge end of the stuffing horn with the disk central hole in axial alignment with the longitudinal axis of said stuffing horn.

18. An apparatus for automatically and continuously producing an encased food product having a substantially uniform diameter and substantially flat ends comprising;
   (a) a stuffing horn through which the product to be encased is expressed;
   (b) means for mounting a shirred tubular casing and a plurality of flattening annular disks on said stuffing horn, said disks being disposed inside an unshirred portion of said casing, said flattening annular disks each having a central hole and being detachably-attached in paired sets, said horn extending through said disk central holes, each disk in the paired set being fixedly-attached by means of a flexible tubular membrane to a disk of an adjoining paired set;

(c) positioning means for engaging and axially moving a paired set of said disks from said plurality to a preset position proximate to the discharge end of said horn;

(d) stop means at said preset position for engaging and holding one disk of said paired set while leaving the other disk of said paired set free to move longitudinally away from said stuffing horn in response to the introduction of food product from said stuffing horn discharge end into said casing and between said paired sets of disks; and, (e) flow means for passing product through said stuffing horn and into said casing between said one disk and said other disk of the pair and seParating said paired set.

19. The apparatus of claims 17 or 18 wherein said means serving to mount said casing and disks on said stuffing horn includes a portion adapted to carry said plurality of annular disks.

20. The apparatus of claims 17 or 18 wherein said means serving to mount said casing and disks on said stuffing horn includes a portion having a circular or elliptical cross section adapted to carry said plurality of annular disks.

21. The apparatus of claims 17 or 18 additionally having sizing means located about said stuffing horn to assist in stretch-sizing the unshirred portion of said casing.

22. The apparatus of claim 18 which additionally contains emulsion seal means located proximate to said stop means and co-acting with the outer periphery of said one disk of said pair being held by said stop means, said emulsion seal means effecting a seal for said unshirred portion of said casing at the periphery of said one disk.

23. The apparatus of claim 22 wherein said emulsion seal means is a split ring.

24. An apparatus for automatically and continuously producing an encased food product having a substantially uniform diameter and substantially flat ends comprising in combination: a stuffing horn assembly including a support tube having an inlet end and a discharge end for conveying food product from a supply source, said support tube adapted to carry a shirred tubular casing article, and said support tube having a tube portion adapted to hold an unshirred portion of said shirred tubular casing article including a plurality of axially disposed flattening annular disks inside said unshirred portion of casing with each disk having a central hole, said tube portion extending through the central hole of said annular disks; means for advancing selected ones of said flattening annular disks to said discharge end; means for introducing a food product to be stuffed between the advanced selected flattening annular disks; and control means operatively associated with said stuffing horn assembly to selectively control a cycle of successive stuffing and casing closing operations including means for moving said disks off of said support tube, thereby producing an encased product having a predetermined length and diameter with flat ends formed by one of the advanced selected annular disks proximate to and inside each end of said encased product.

25. In combination, an apparatus and article for automatically and continuously producing an encased food product having a substantially uniform diameter and substantially flat ends comprising in combination: a shirred tubular casing article; a stuffing horn assembly including a support tube having an inlet end and a discharge end for conveying food product from a supply source, said support tube adapted to carry said shirred tubular casing article and having a tube portion adapted to hold an unshirred portion of said shirred tubular casing article, including a plurality of axially disposed flattening annular disks inside said unshirred portion of casing with each disk having a central hole, said tube portion extending through the central holes of said annular disks; means for advancing selected ones of said flattening annular disks to said discharge end; means for introducing a food product to be stuffed between the advanced selected flattening annular disks; and control means operatively associated with said stuffing horn assembly to selectively control a cycle of successive stuffing and casing closing operations, including means for moving said disks off of said support tube, thereby producing an encased product having a predetermined length and diameter with flat ends formed by one of the advanced selected annular disks being proximate to and inside each end of said encased product.

26. The apparatus of claim 24 or 25 which additionally includes a casing sizing or holdback means.

27. The combination of claim 25 wherein said casing article additionally includes a casing sizing or holdback means disposed within said unshirred portion.

28. The apparatus of claim 26 wherein said sizing means is attached to said stuffing horn.

* * * * *

UNITED STATES PATENT AND TRADEMARK OFFICE
CERTIFICATE OF CORRECTION

PATENT NO. : 4,551,884
DATED : November 12, 1985
INVENTOR(S) : Vytautas Kupcikevicius; Vytas Andrew Raudys It is certified that error appears in the above-identified patent and that said Letters Patent is hereby corrected as shown below:

In col. 5, line 61, change "disclose,d" to -- disclosed --.

In col. 6, line 43, change "Pat.No. 4,446,463" to -- Pat. No. 4,466,465 --.

In col. 6, line 55, change "Pat.No. 4,446,985" to -- Pat. No. 4,466,984 --.

In col. 9, line 50, change "430,982" to -- 430,582 --.

In col. 13, line 30, delete the word "portion".

In col. 15, line 19, change "seParating" to -- separating --.

Signed and Sealed this

Twenty-second Day of April 1986

[SEAL]

Attest:

DONALD J. QUIGG

*Attesting Officer*     *Commissioner of Patents and Trademarks*